UNITED STATES PATENT OFFICE.

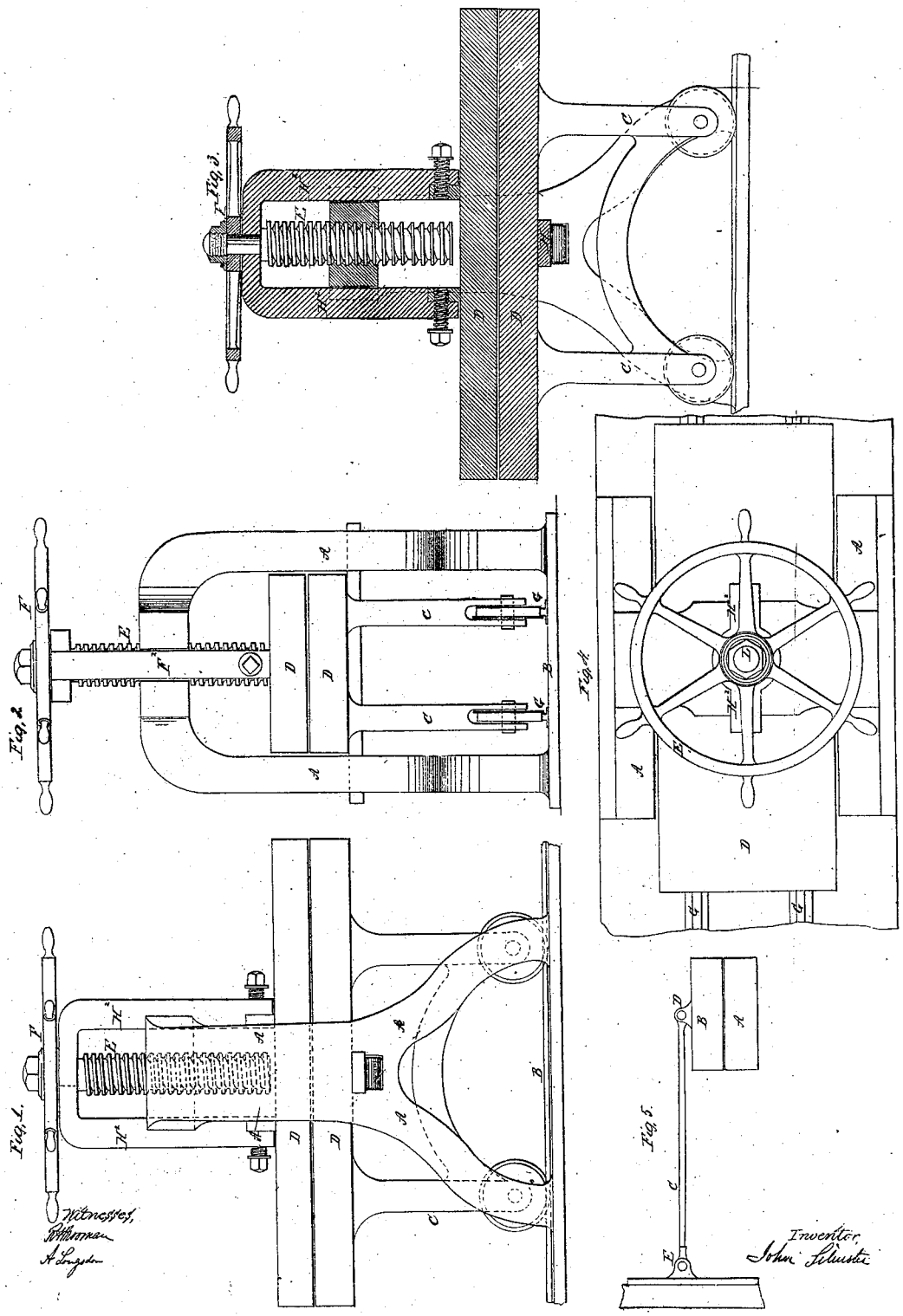

JOHN SILVESTER, OF WEST BROMWICH, ENGLAND.

PROCESS FOR RESTORING SHAPE AND TEMPERING ARTICLES OF HARDENED STEEL.

Specification of Letters Patent No. 9,237, dated August 31, 1852.

*To all whom it may concern:*

Be it known that I, JOHN SILVESTER, of West Bromwich, in the county of Stafford, England, whitesmith, a subject of the Queen of Great Britain, have invented or discovered new and useful Improvements in Curing or Remedying the Distortion which Takes Place in Steel Plates During the Operation of Hardening; and I, the said JOHN SILVESTER, hereby declare that the nature of my said invention and the manner in which the same is to be performed are fully described and ascertained in and by the present specification thereof, reference being had to the drawings hereunto annexed—that is to say:

Whereas many articles formed of steel such as saw blades become spoiled by their being warped in the process of hardening and have either to be hammered into form or softened and rehardened and in some cases they are so damaged that they have to be altogether thrown aside, my invention consists in curing or remedying the distortion which has taken place in steel plates during the operation of hardening by clamping them between dies of proper form previously heated to a sufficient degree to draw or let down the temper.

Figure 1 is a side elevation. Fig. 2 an end elevation. Fig. 3 a longitudinal section and Fig. 4 a plan of a machine by which this is effected.

A A is a strong metal frame which is mounted on a basement plate B to which it is firmly connected.

C is a carriage which carries dies D D between which the steel plates are placed:—the dies D, D, are heated in a furnace to such a degree as will "bring back" or "let down" the hardness of the steel plate to the required temper. The upper die is then raised by means of the sliding frame H, and the steel plates are inserted between the dies and after the plates are sufficiently affected by the heat of the dies to admit of being straightened and compressed. Then by means of the screw E and hand wheel F the dies are compressed or forced together so as to bring them to bear uniformly upon the steel plate between them. When the plate has arrived at a requisite degree of temper the upper die is raised by means of the screw E, and the plate removed. The carriage C runs upon rails G G by which means it is more readily moved and put into the furnace and into its position under the frame A.

H H is a frame or bearer which is slid underneath the lower die while the dies are being brought together by the action of the screw in order that this bar may relieve the pressure from the axles of the carriage.

The upper die can be raised by means of the screw and the introduction of the sliding frame H², to such an extent as to admit of the plates being either removed or introduced at pleasure.

Fig. 5 is a cross section of a pair of dies for thin steel plates on which the weight of the upper die may be sufficient for producing the requisite pressure without the assistance of a screw or other press.

A is the lower die, B the upper one, C a lever which is jointed to the upper die by means of a pin D, the other end of the lever is jointed to some fixed point as at E. These dies are in all cases to be heated previous to the steel plate being laid between them.

Having now described my said invention and the manner in which the same is to be performed I declare that what I claim is—

The curing or remedying the distortion which has taken place in steel plates during the operation of hardening; by compressing them between dies previously heated to a sufficient degree to "bring back" or "let down" the temper, the mechanical pressure to be applied while the plates are in the course of being tempered (the pressure being continued during the process of tempering) as before exemplified and described.

JOHN SILVESTER.

Witnesses:
R. A. BROOMAN,
A. LONGSDON.